June 24, 1952

W. B. PETERSON, JR., ET AL 2,601,625

CAN-END MAKER

Filed June 22, 1948

INVENTORS
WILLIAM BERNARD PETERSON, JR.
ROLAND ERNEST RENARD
BY
ATTORNEY

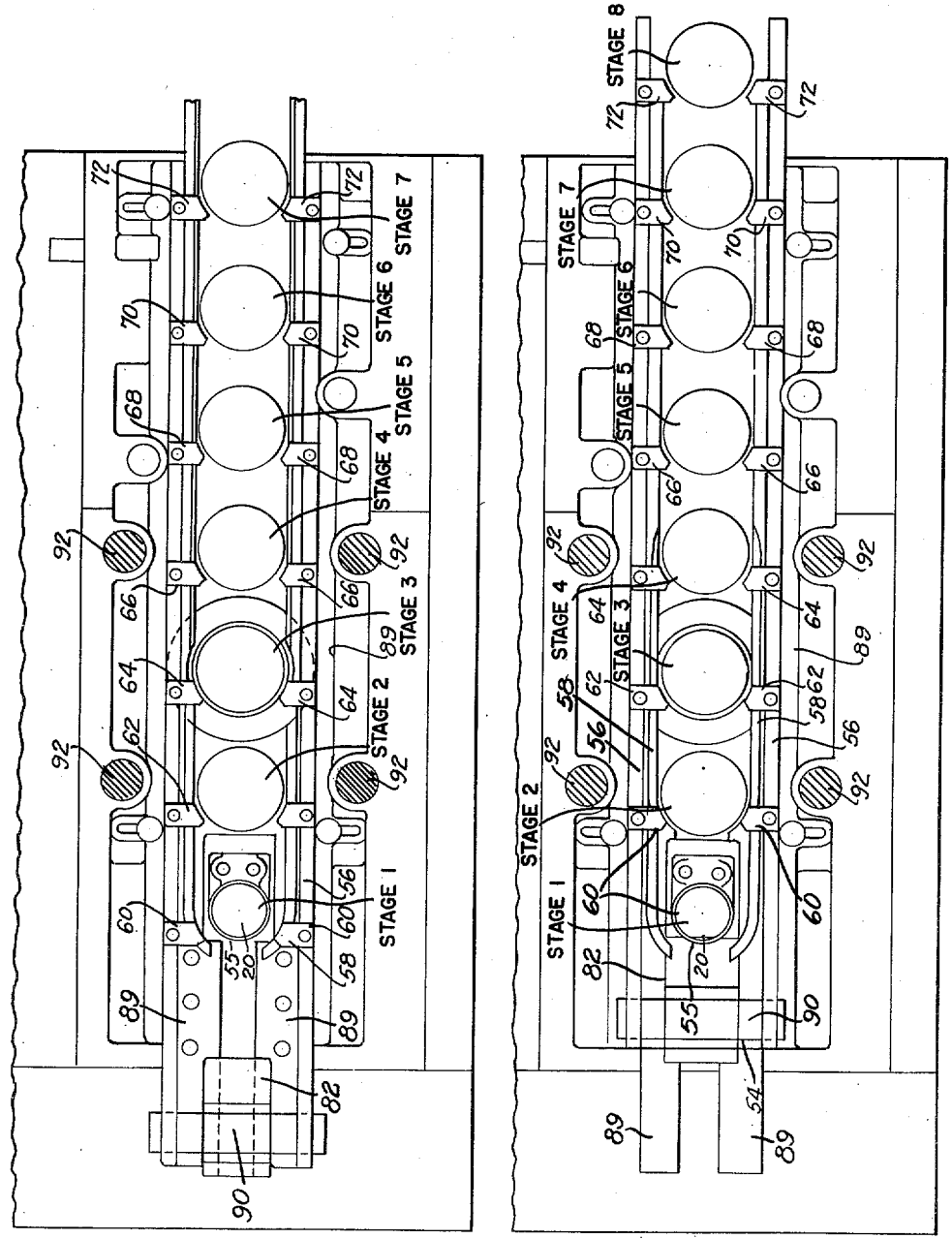

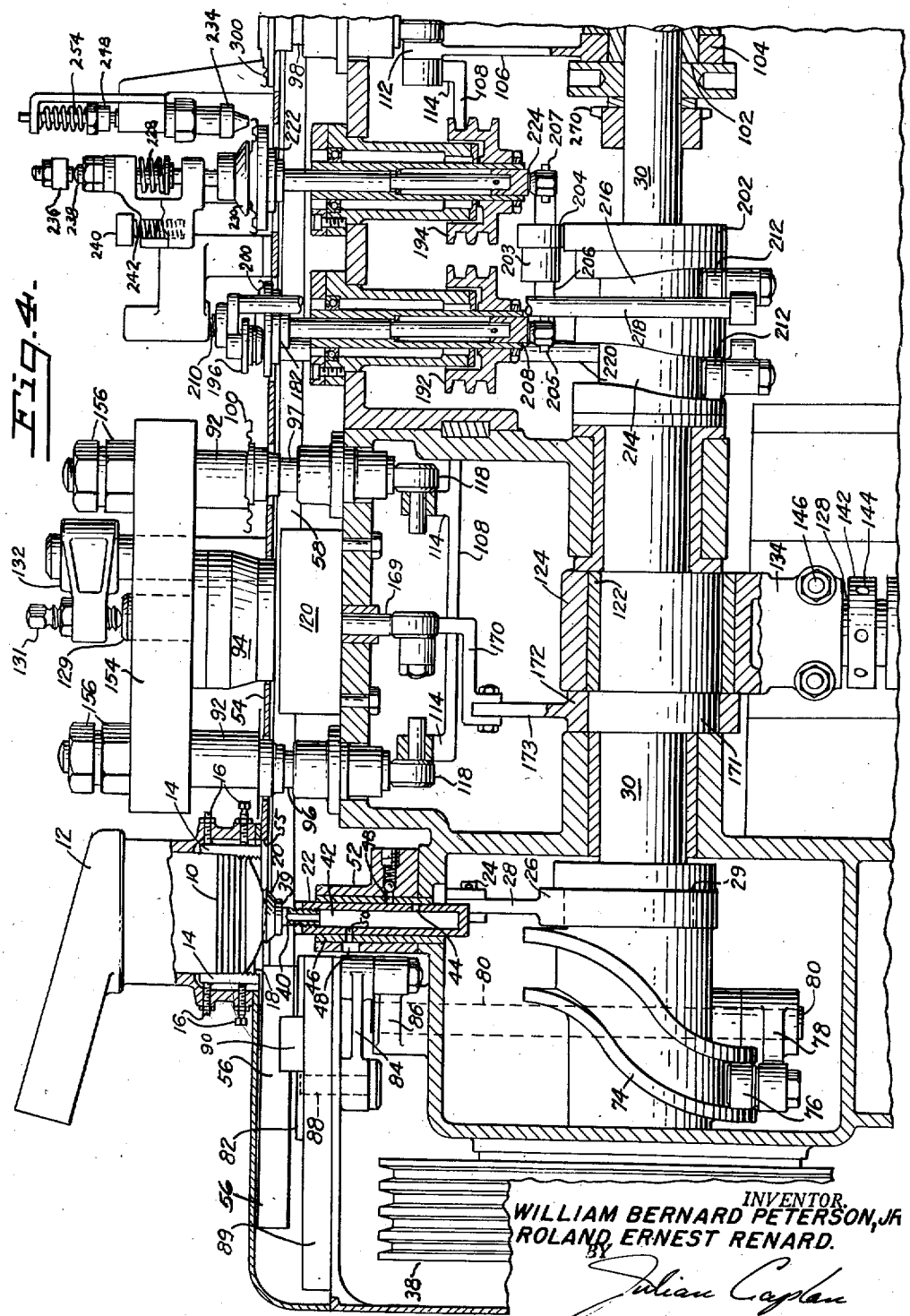

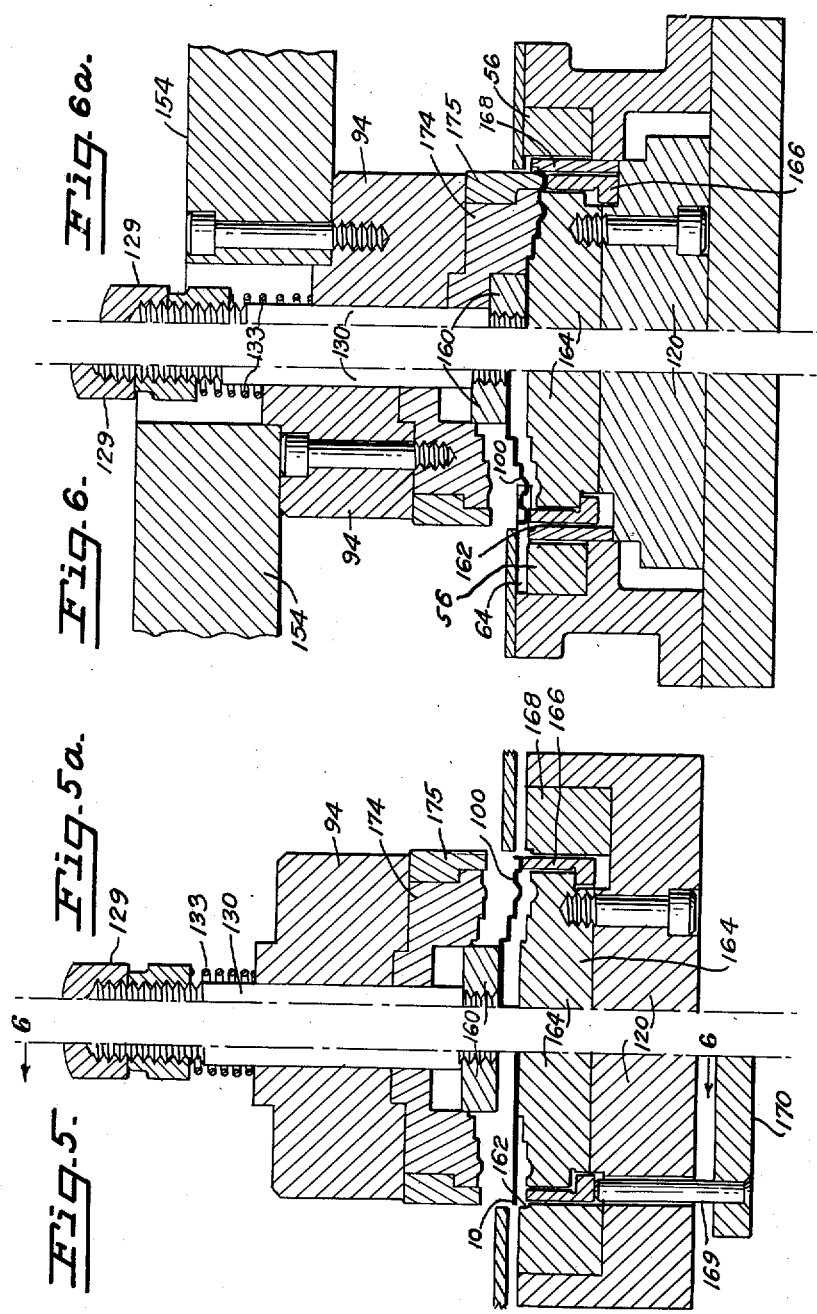

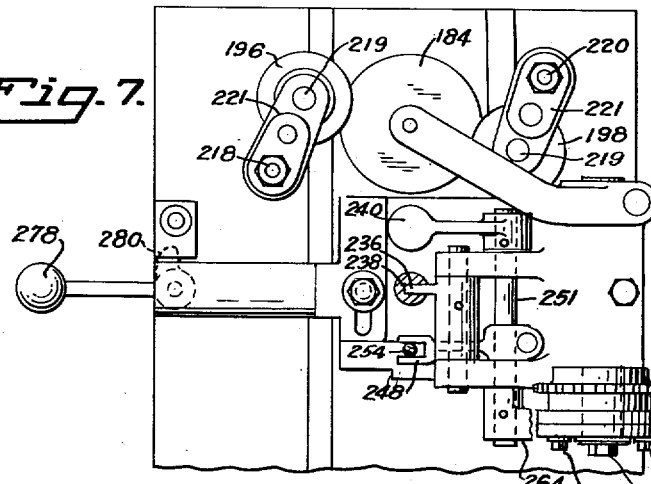
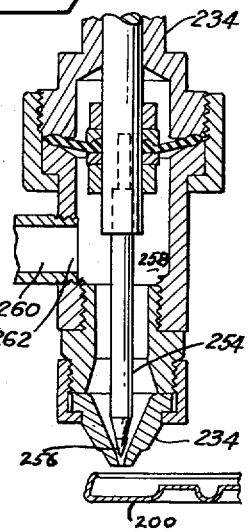
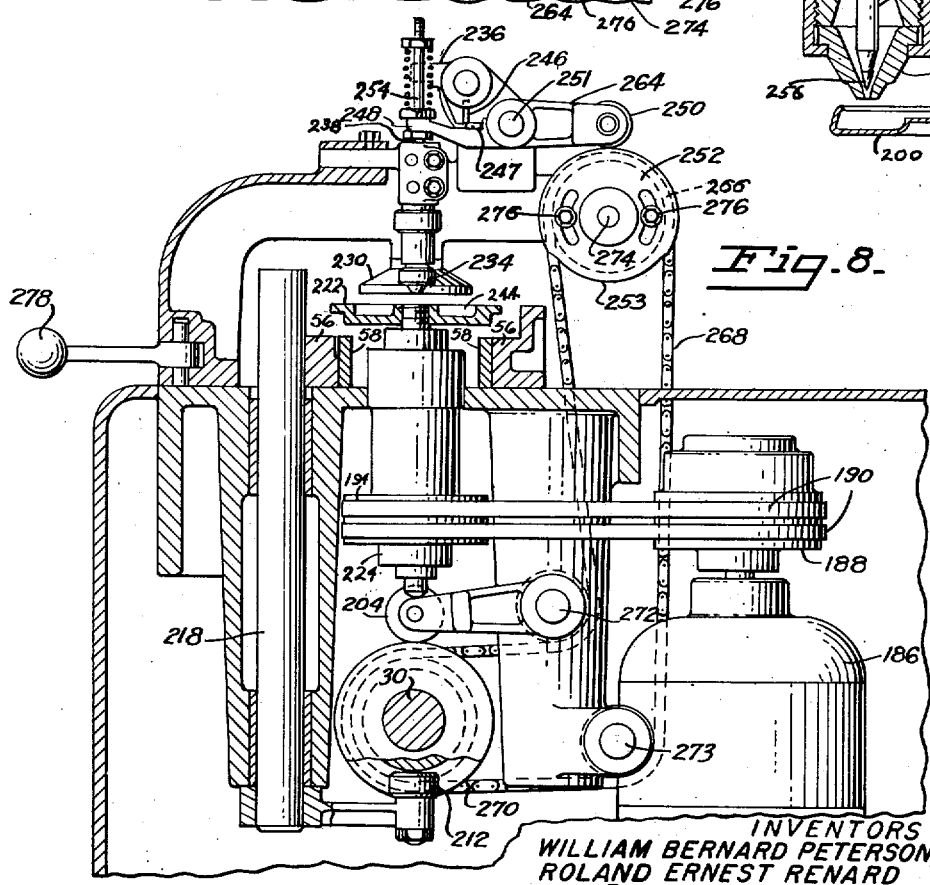

June 24, 1952 W. B. PETERSON, JR., ET AL 2,601,625
CAN-END MAKER
Filed June 22, 1948 7 Sheets-Sheet 6
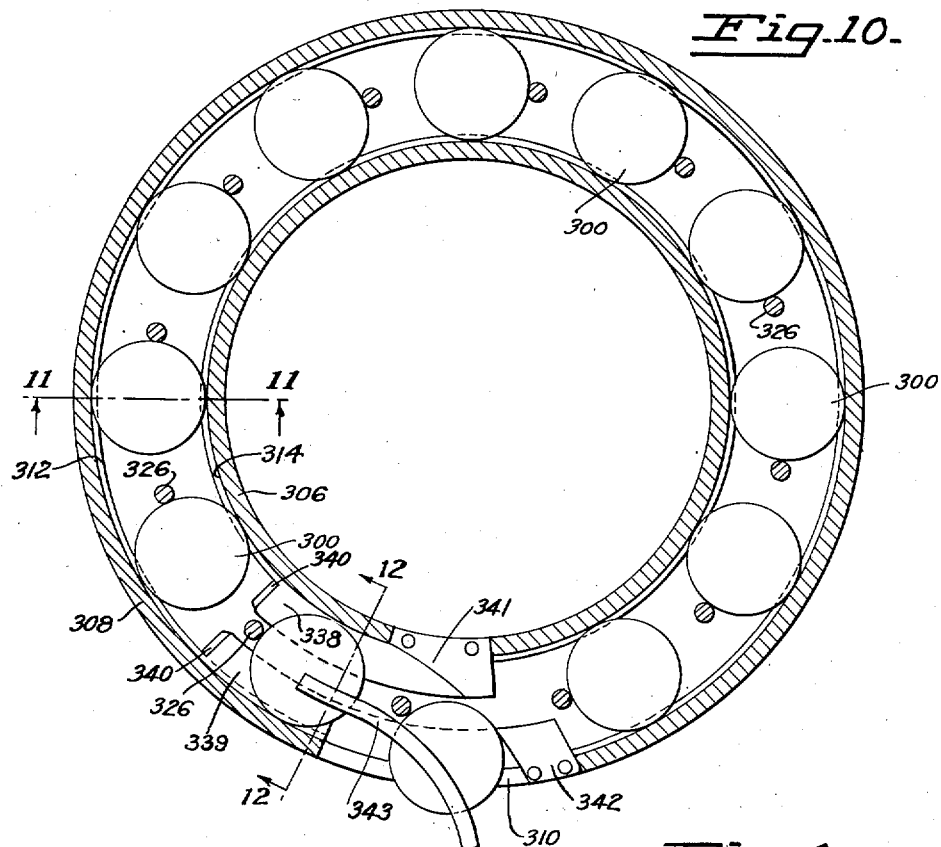
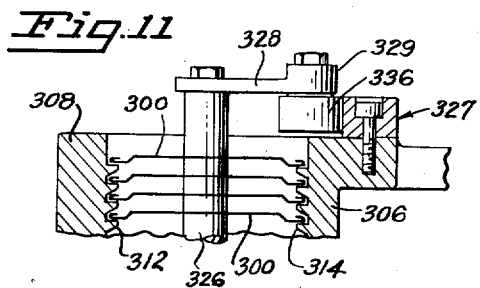
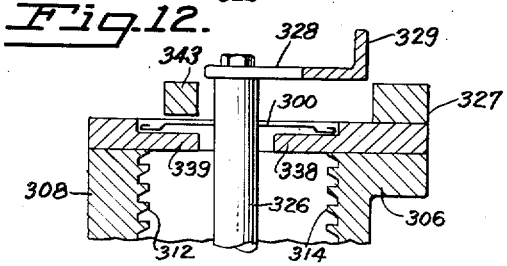
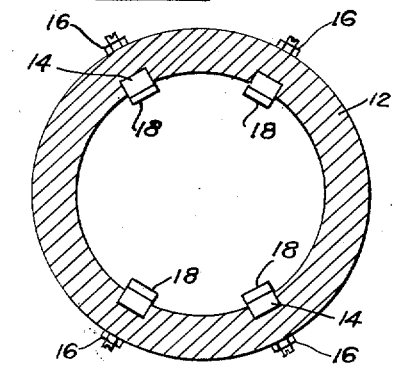
INVENTOR.
WILLIAM BERNARD PETERSON, JR.
ROLAND ERNEST RENARD
BY
*Julian Caplan*
ATTORNEY

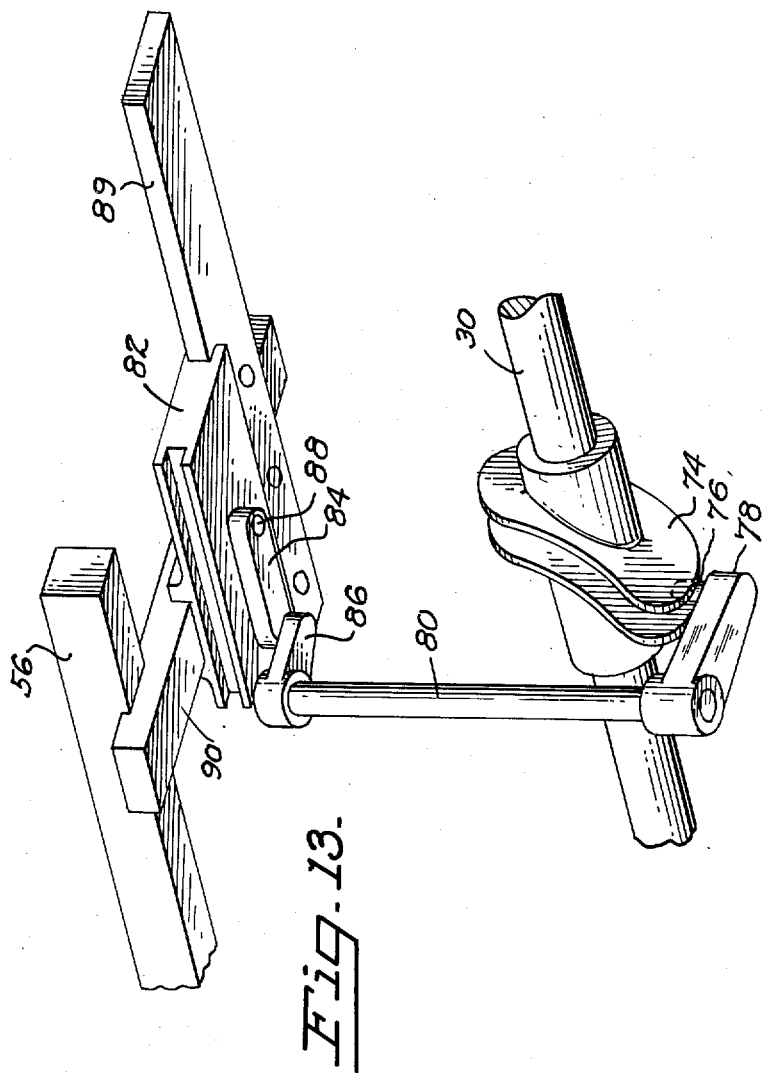

Patented June 24, 1952

2,601,625

UNITED STATES PATENT OFFICE 2,601,625

CAN-END MAKER

William Bernard Peterson, Jr., San Francisco, and Roland Ernest Renard, Los Gatos, Calif., assignors to Pacific Can Company, San Francisco, Calif., a corporation of Nevada Application June 22, 1948, Serial No. 34,505

3 Claims. (Cl. 113—80)

This invention relates to an improved apparatus for the manufacture of lined can ends or covers which are placed on the can body to complete the can.

An important object of the invention is to provide a single automatic machine which will manufacture can ends in quantity from punched discs, performing all the steps of feeding flat discs into a work line, forming each disc, curling the flange around the circumference of the formed end, applying a lining compound within the trough near the curl, and curing the lining compound for the proper amount of time in a hot air dryer.

Another important object of the invention is the provision of apparatus for the manufacture of can ends which will require a minimum of handling of the materials entering into the finished operations.

Another highly important object of the invention is the production of can ends in large quantities and on a full commercial scale.

Another object of the invention is the provision of apparatus for making can ends from flat sheets of metal without previously scroll-cutting the sheets. As a result of achieving this important object, the discs from which the ends are made can be punched out closer together, resulting in a saving of tin plate, which is always a desirable feature considering the tremendous quantities of plate which are used in can making.

According to present practice, end blanks are punched and formed in a single operation by a combination die. Several disadvantages of this old method are overcome by this invention, including:

(1) The great expense of manufacturing, sharpening, and maintaining a combination die;

(2) The fact that two separable operations are combined in one, and when the cutting edges of the punch and die become dulled by use, the machine cannot perform either operation satisfactorily;

(3) The use of scroll-cut sheets required by the combination die; an allowance must be given on either side of the scroll line equal to twice the distance between the scroll line and the edge of the blanks; if the sheet did not have to be scroll-cut, the distance of allowance could be that between adjacent blanks and could therefore be reduced by half;

(4) The uneven quality of can ends which are formed and cut simultaneously from the flat sheets.

Therefore, a further important object is to make better can ends by separating the forming operation from the punching operation.

Another object of the invention is to enable the use of less expensive separate dies for the punching and forming of can ends, in place of the expensive combination dies now universally used, and without any loss of speed thereby. A standard blanking punch can be used to make the discs.

A further object of the invention is to produce more ends per minute with lower spoilage than now results.

A further object of the invention is to provide a machine by which can ends can be made from flat sheets which are not scroll cut. In this connection it should be noticed that, should it be desired, scroll-cut strips could be employed in this invention, though their disadvantages would then be present. Such strips may be fed into the machine at stage 3 thereof by using a combination die to punch and form the discs in one operation.

It is also an object of the present invention to enable the manufacture of can ends to be carried on in less floor space than is occupied by the endmaking machinery now in general use, and by less operators and laborers than are now required.

A further object of the invention is to provide a can end manufacturing apparatus always open to view and with positive control at every stage.

Numerous other objects and advantages of the invention will be apparent as it is better understood from the following description, which, taken in connection with the accompanying drawings, discloses a preferred embodiment thereof, although various changes may be made without departing from the invention as claimed. For example, the forming station (stage 3) could be replaced by the standard two-operation die, punching and forming end blanks from scroll-cut strips, and the machine would still effect a great saving of time and personnel by combining efficiently all the later processes in one machine in the novel manner described in detail later on; in such modification of the machine, stages 1 and 2 are eliminated and the strips are fed directly to the combination punch and press.

A general comparison of the old method and the new method will be of some aid in understanding the points of novelty described and illustrated in detail by the drawings and description. Whereas the old method consists of:

(1) Placing flat sheets in a scroll-cutting machine, (2) Scroll-cutting the sheets,
(3) Withdrawing the scroll-cut strips from the machine,
(4) Manually placing the scroll-cut strips in the die machine,
(5) Punching and forming the blanks in one operation from the scroll-cut strips,
(6) Conveying the blanks to a curling machine,
(7) Curling,
(8) Conveying the curled ends to a lining machine,
(9) Lining,
(10) Conveying the lined ends to a dryer, and
(11) Drying them, the present method has the following steps:
(1) Placing flat, plain sheets in a punch,
(2) Punching them,
(3) Placing the punched discs in boxes or on a conveyor,
(4) Placing the discs in the endmaker which automatically carries them through the separate stages of:
   (A) Forming,
   (B) Curling,
   (C) Lining, and
   (D) Curing or drying.

In the drawings:

Fig. 2 is a plan of a portion of the machine taken along the line 2—2 of Fig. 1, showing the feed bar and associated parts in its extreme rearward position;

Fig. 3 is a view similar to Fig. 2, showing the feed bar in its extreme forward position;

Fig. 4 is a front view in sectional elevation of a portion of the machine, omitting some parts for the sake of clarity and showing only portions of other parts; this view is taken at the middle of a cycle of the operation of the machine;

Fig. 4a is a horizontal section through the hopper;

Figs. 5 and 5a are detailed views in sectional elevation of the forming press in upward position, Fig. 5 showing one half of the press at the beginning of a cycle and Fig. 5a showing the other half at the end of a cycle;

Figs. 6 and 6a are detailed views, in section, taken along the line 6—6 of Fig. 5; Fig. 6 showing the left half of the press in upward position and Fig. 6a showing the other half in downward position;

Fig. 7 is a plan of those parts of the machine which perform the curling and lining operations;

Fig. 8 is a side view in elevation and in section of the structure of Fig. 7;

Fig. 9 is a sectional view of the lining nozzle;

Fig. 10 is a plan, in section, showing the discharge apparatus from the dryer;

Fig. 11 is a detail view in section taken along the line 11—11 of Fig. 10;

Fig. 12 is a detail view in section taken along the line 12—12 of Fig. 10; and

Fig. 13 is a perspective of a portion of the machine showing the feed bars and associated parts.

Figure 1:
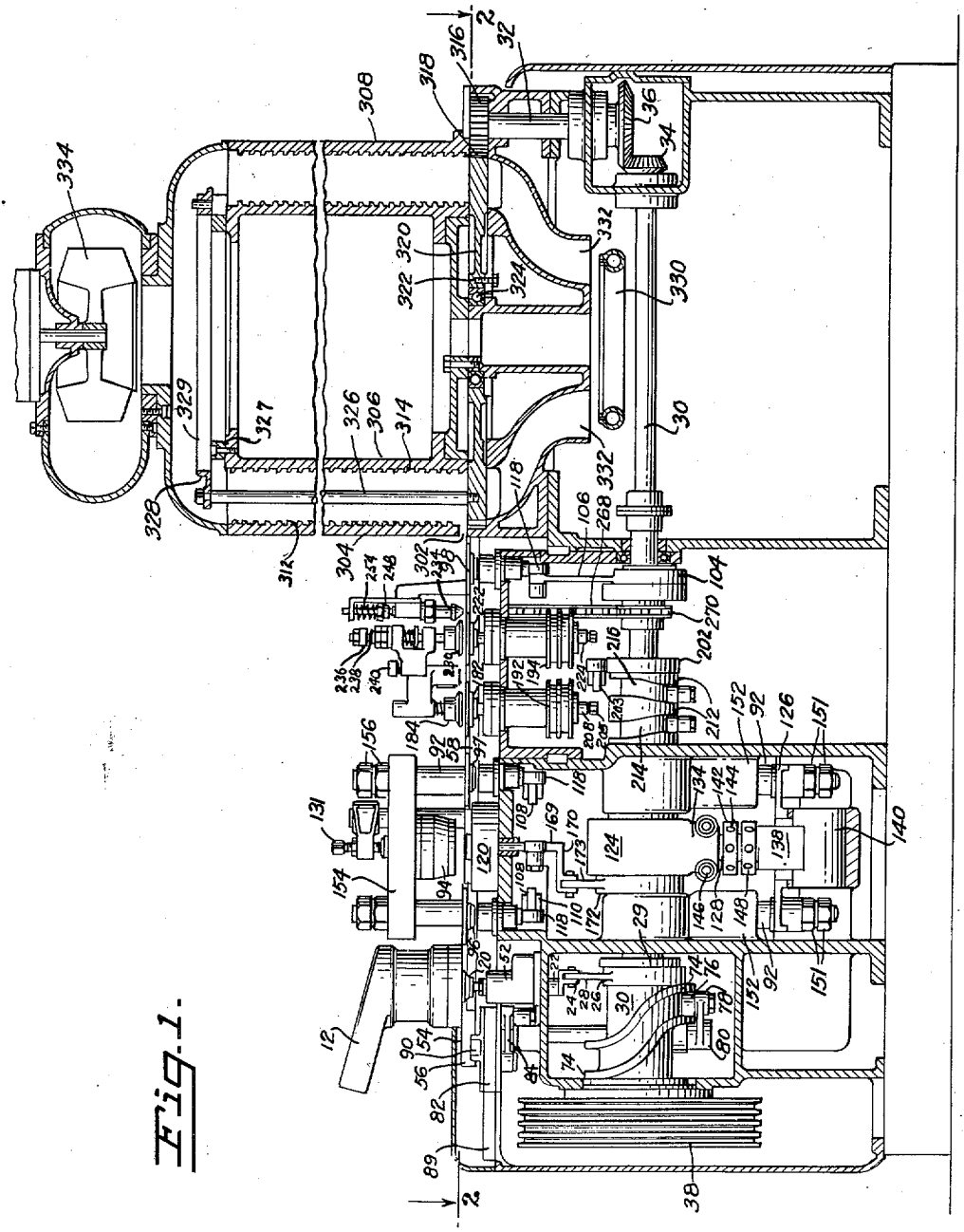
Fig. 1 is a longitudinal section of the machine taken at the beginning of a cycle of operation of the machine.

To facilitate an understanding of the invention the description is given in several sections, each corresponding to a stage of operation on a particular end as it proceeds through its manufacture. However, it should be noted that this plan of description is in some respects an arbitrary one, since all but the first of these stages are performed simultaneously on the machine which operates from a single main drive shaft and has closely coordinated parts, and that for any particular end these stages succeed one another in a fraction of a second.

STAGE 0—PUNCHING

Stage 0 is not illustrated, because it is a preparatory stage, well known to the art and capably done by existing machinery. It consists in feeding the familiar flat sheets of tin plate or similar material suitable for can ends into a punch, where round discs 10 are punched from the sheets. This stage is mentioned here to give a complete picture of the endmaking process, and because a feature of this invention is that it requires only punched unformed discs. Due to subsequent operations of the machine which forms, curls and lines the discs, at stage 0 no unusual or expensive die is required, and no scroll cut sheets are required. To the obvious savings in equipment and in material are added the saving in scrap which results from separating the forming operation from the punching operation so that the discs can be punched closer together than where a scroll-cut sheet is used.

The discs 10 may be collected in boxes and later delivered to the illustrated machine, or they may be conveyed there directly by suitable automatic machinery. In either case, a multiple press run by one operator can punch enough discs to supply two of the machines to be described, thus resulting in further economy.

STAGE 1—FEEDING

A. *The vacuum cup*

The purpose of the feeding operation is to supply metal discs to the feed line of the machine one at a time in a rapid, continuously pulsating line. For this purpose, they are preferably picked one at a time from the bottom of a stack of discs by a vacuum cup which carries each disc on to the feed bar and releases it there. How the feed bar sends each blank through each successive stage and simultaneously supplies all stations with a blank for each cycle will be subsequently described.

The discs 10 may enter the hopper 12 (provided with a circular central bore) from a conveyor which automatically carries them there from the press, or they may be placed or stacked in the hopper by an operator. Four arcuately-spaced chucks 14 are positioned in the hopper, their angular relation, considering a point on the central axis of the hopper bore as the vertex of the angles, being such that the angles between each of two pairs are approximately 60° and the angle between one chuck of each pair and the closest chuck of the other pair is 120°. Adjustment screws 16, screwed into hopper 12 are provided for projecting and retracting the chucks into and from the central bore so as to accommodate discs of various diameters, and the chucks are desirably so positioned that the lower portion of each chuck projects farther into the central bore than the upper portion, thus more firmly gripping the stack of discs. Serrations 18 on the lower portions of the chucks 14 prevent the stack of discs from falling. As each disc is pulled downward from the stack by vacuum cup 20, as hereinafter more fully described, said disc flexes about one of its diameters and thus escapes from the chucks 14.

Slide valve 22 on which rubber vacuum cup 20 is mounted is attached by a pin 24 to the projecting arm 28 of the eccentric collar 26. This collar 26, in turn, rides on an eccentric 29 rigidly fixed on main drive shaft 30. Rotation of shaft 30 rotates eccentric 29 and lifts and lowers collar 26, and this motion is transmitted to reciprocate up and down slide valve 22 and vacuum cup 20.

The single drive shaft 30 in the unitary end-making machine economically supplies power to every stage of the machine, which accomplishes what has previously required four machines (former, curler, liner and dryer) and conveyor systems between them, each having a separate driving means and therefore no practical method of synchronizing them. In this machine eccentrics, cams, and other parts attached to the shaft 30 drive the reciprocating up-and-down actions of each stage, including the idling stages, and the reciprocating sideward motion of the feed bar which transfers the blank 10 from one stage to another. In addition to performing these functions, the shaft 30 also drives the dryer conveying system through auxiliary shaft 32, by means of the complementary bevel gears 34 and 36. The power which drives shaft 30 may be supplied through fly wheel 38 or in some other manner.

Reciprocation of the vacuum cap 20 automatically regulates the suction system. Through an opening 39 in the rubber cup 20 projects the tubular end 40 of hollow valve 22. Tube 40 connects the interior of the cup 20 with the vacuum chamber 42 inside valve 22. Valve 22 is pierced by two openings 44 and 46, and as valve 22 moves up and down, these openings appear at different times adjacent openings 48 and 50, respectively, in valve casing 52. Except when one of the openings 44 or 46 is opposite one of the openings 48 or 50, the chamber 42 is sealed from everything except the interior of vacuum cup 20, and only one of the openings 44 or 46 communicates with its respective opening 48 or 50 at any one time.

Opening 48 is connected by tubing to a powerful vacuum pump (not shown), and opening 50 passes to the open atmosphere. Thus when rod 22 reaches the top of its stroke, cup 20 comes into contact with the bottom of the bottom disc 10 of the stack of discs in hopper 12, the openings 44 and 48 are opposite one another, and the pressure inside chamber 42 and cup 20 is reduced to a vacuum. This vacuum is held as valve 22 descends, until, at the time at which disc 10 has been carried down on to feed bed 54, opening 46 passes in front of opening 50 and air flows into chamber 42 and releases the vacuum. Then cup 20 can be pulled below feed bed 54 through an opening 55, releasing disc 10 and getting out of the way so that it will not interfere with the operation of feed bar 56.

It will be understood that the foregoing description of the vacuum feed mechanism sets forth merely one type of feed which may be used. It would be possible to substitute other mechanism, such as a moving finger of a thickness substantially that of disc 10 which pushes the lowermost of the discs in a direction transverse to the axis of the stack, to accomplish the same result without impairing the operation of the machine as a whole.

B. *The feed bar*

The feed bar 56 shuttles back and forth on the feed bar guide rail 58. Fingers 60 move the disc from stage 1 to stage 2; fingers 62 move it from stage 2 to stage 3; fingers 64 move it from stage 3 to stage 4; fingers 66, 68, 70, and 72 continue the stage to stage progress. All these fingers are rigidly bolted to the feed bar 56, and extend out toward each other sufficiently to be able to grasp the discs and blanks along the line, but far enough apart to pass on each side of the rods, idle stages, etc., without hitting them.

When feed bar 56 is in its extreme rear position (as in Fig. 2), the fingers are slightly back of the end or end blank at each stage. As the feed bar 56 is moved forward they push the blank or end to its next position, reaching that point exactly at the most forward portion of the stroke, shown in Fig. 3. As they move back, all the blanks or ends are elevated or depressed so that the rear edges of the fingers cannot push back the blank or end in back of them. How this elevation or depression is accomplished will be described later; only the operation of the feed bar will be described now.

Feed bar cam 74 (refer to Figs. 1, 4 and 13) is rigidly attached to main drive shaft 30 and provides a track in which cam roller 76 moves back and forth as shaft 30 revolves. Arm 78, on which roller 76 is mounted so that it may rotate, is rigidly fastened to the bottom of rocker shaft 80, and thus rocker shaft 80 is rotated back and forth as shaft 30 rotates.

Above the top of shaft 80 is crosshead 82 which is locked to feed bar 56 through cross-bars 98. Link 84 connects arm 86 on shaft 80 and crosshead 82 through pins 88 to impart a linear reciprocation backwards and forwards in the tracks 89.

Feed bar 56 reciprocates on feed bar guide rail 58, with which it is in all places in contact. The two components of feed bar 56 are joined by cross bars 90, and the distance between the two components can be varied to fit different sized can ends.

Since all the reciprocating vertical motion of stages 1 to 7 and the reciprocating horizontal motion of feed bar 56 are driven by one shaft 30, synchronization becomes a matter of the proper design of cams and eccentrics. Thus feed bar 56 is automatically synchronized to the motion of valve 22, and feed bar 56 is in its rearward position when cup 20 delivers disc 10 to the feed line bed 54.

STAGE 2—IDLE

Feed bar fingers 60, 62, 64, 66, 68, 70 and 72 are the same distance apart and move the blank forward the same distance each cycle. Due to space occupied by the forming operation (stage 3) and especially by the posts 92 which support and carry forming punch 94, it takes three cycles to get the blank in and out of stage 3, and accordingly stages 2 and 4 are idle stages; due to space covered by the lining operation, stage 7 is also an idle station. In each of these stages disc 10 (or formed blank 100 or curled and lined end 300) is lifted on the top surface of rods 96, 97, and 98 above feed bed 54, so that when fingers 62, 66 and 72, respectively, move backward they will not push disc 10 back into stage 1, formed blank 100 back into stage 3, or lined end 300 back into stage 6, but will pass on either side of the thin rods 96, 97 and 98.

Rods 96, 97 and 98, which are permanent magnets and hold the ends magnetically as they raise them above the feed bed 54, are raised and lowered by eccentric 102, which is attached to main drive shaft 30 immediately below rod 98 on stage 7. Collar 104 surrounds eccentric 102, and connecting rod 106, extending upwardly therefrom to rocker arm 112 which rotates back and forth the rocker shaft 108, which extends from stage 2 to stage 7, just out of the way of the machinery below the other stages. Shaft 108 is supported for its reciprocal rotation by bearings (not shown) and in Fig. 1 is shown only in short sections near the idle stages. The rod has identical arms 114, which reciprocate the identical rollers 118 to transmit the drive which lifts and lowers rods 96, 97 and 98.

By this method positive control is obtained synchronizing the three idle stages with the feed bar mechanism.

STAGE 3—FORMING

A. *The press*

In stage 3 the flat disc 10 is formed into an uncurled end blank 100 by press 94 and die 120 (see Figs. 5, 5a, 6 and 6a). It should be noted that the end is made upside down in comparison with usual methods of manufacture, in order that it be in proper position for lining (stage 6).

Forming press 94 is a four-posted press which is reciprocated up and down by an eccentric means working off the main drive shaft 30. As in all the rest of the machine, the driving parts are, so far as possible, kept below the feed table so that all the operations on the end itself are visible at all times; the feed table is not obscured by an excess of mechanisms interfering with the view of the successive operations and possibly contaminating the ends through lubrication drippage.

An eccentric 122 on main drive shaft 30 determines the stroke of the reciprocating parts. Collar 124 around eccentric 122 drives the crosshead 126 through connecting rod 128. Rod 128 bears at one end right-hand threads by which it is threaded into a tapped recess in the projecting portion 134 of the lower end of collar 124. The other end of connecting rod 128 bears a left-hand thread by which it is threaded into nut 138 and crosshead pin 140. Connecting rod 128 also carries a flange 142 with a series of openings 144 around its periphery, in which a wrench can be inserted to turn the connecting rod 128 to change its position relative to collar 124 and crosshead pin 140 and nut 138 and thereby adjust the position of the forming punch 94.

For further rigidity, collar 124 is locked to rod 128 by bolts and nuts 146, and nut 138 has a lock collar 148 for the same purpose. Crosshead pin 140, it will be noted, has been reduced to a minimum on its no-load side.

The cast crosshead 126 is rigidly attached to nut 138 and held in place on connecting rod 128 by nut 138 and pin 140, most of the load being transmitted from rod 128 through nut 138, rather than through pin 140. Crosshead 126 is square, and near each of its corners is an opening through which pass the lower ends of the four tie rods or posts 92. Lock nuts 151 are threaded on tie rods 92 and hold them rigidly to crosshead 126.

Immediately above crosshead 126, each of the posts 92 is guided by a long hub 152 which has a bushing in each end. Thus posts 92 serve as moving tie rods, tying the crosshead 126 to bolster plate 154. Rods 92 are rigidly secured to bolster plate 154 by nuts 156. Thus the main drive shaft 30 drives, through eccentric 122, press 94 in a reciprocating vertical motion having the same period as that of feed bar 56.

B. *The forming dies*

Forming dies 94 and 120 are shown in detail in cross-section in Figs. 5, 5a, 6 and 6a. As the disc 10 is moved from stage 2 to stage 3 by fingers 62, it falls into a recess 162, in which is the lower forming die 120. The die core 164 is of the form shown in cross-section in Figs. 5 and 6 and mates with core 174 of the upper die 94 and may be changed to accommodate differently sized and shaped ends and has around its circumference ring 166, which is in turn surrounded by die ring 168. Ring 166 is cam-controlled to move upwardly as the upper die 94 retracts to strip the formed end blank 100 from die ring 168 and die core 164 and restore it to the level of the feed bed 54. The aforementioned stripping action is accomplished by pins 169 abutting draw ring 166 and moving it upward relative to the stationary die core 164, said pins being attached to pin plate 170, which reciprocates vertically by reason of rotation of eccentric 171 on main shaft 30, said eccentric being surrounded by collar 172 attached to connecting rod 173 which is attached at its other end to pin plate 170.

As die 94 is raised by bolster plate 154, knockout pad 160 is forced to move downwardly relative to the die 94, thus loosening the formed blank 100 from the die if it should happen to have stuck therein, this relative movement being caused by adjustment nut 129 on rod 130, passing through the center of the die, hitting adjustment screw 131 of abutment 132 and thus forcing knockout pad 160 downwardly relative to the upward movement of die 94 against the action of spring 133, interposed between die 94 and nut 129 and surrounding rod 130. Spring 133 returns pad 160 to its normal position in a recess in the lower face of die 94 when nut 129 is out of contact with adjustment screw 131. Core 174 and ring 175, bolted to die 94, in cooperation with die core 164 and ring 166 in member 120 determine the shape of the panel of end 100 and may be changed to accommodate differently shaped ends.

C. *Operation of forming press*

At the beginning of each cycle of the forming press, the parts are in the position shown in Fig. 5. Blank 10 has just been delivered into recess 162 by fingers 62; knockout pad 160 projects downwardly and ring 166 projects upwardly from normal positions. As die 94 descends, pad 160 retracts relatively speaking, into its recess in the lower face of the die, and ring 166 also recedes but at relatively slower speed so as to retain blank 10 properly centered but below recess 162. Sufficient time is allowed for fingers 62 and 64 to retract from forward to rearward position before die 94 descends.

The end of the downward motion of the press is shown in Fig. 6a. Mating cores 174 and 164 press the blank to form the desired concentric rings of the panel of the end. Rings 175 and 166 press out the trough portion of the flange and ring 168, which is offset with respect to rings 175 and 166, strikes the extreme periphery of the flange upward—thus forming the started flange to assist in curling. Upon completion of the pressing operation, die 94 moves upward and the parts assume the position shown in Fig. 5a. Pad 160 projects from its recess so as to knock the formed blank off the upper die 94 if it has tended to stick thereon and ring 166 projects so as to knock out the blank 100 if it tends to stick in the lower die and to raise the blank back into recess 162. Fig. 6 shows the parts at the same instant as shown in Fig. 5a, but being taken at right angle to the plane of Fig. 5, also shows the position of fingers 64 on the feed bar 56 just prior to moving the formed blank from stage 3 to stage 4.

STAGE 4—IDLE

As has already been described, fingers 64 carry the formed blank 100 to idle stage 4, and from there blank 100 is carried by fingers 66 to stage 5.

STAGE 5—CURLING

In stage 5 the flange of blank 100 is curled in. Rotating chuck 182 is shaped to support formed blank 100 and fit within the die formed countersink of the end, and the spring loaded pressure holder 184 holds the blank 100 steady on chuck 182. Motor 186 drives a variable speed pulley 188, which by belts 190 drives the two pulleys 192 and 194 and rotates the curler chuck 182 and liner chuck 222. By this method the rate of spinning of the ends when forming the curl and while compound is being applied may be increased or decreased as required.

While the foregoing is the preferred form, it will be understood that other means could be substituted to drive one or both chucks variably and independently or in fixed or adjustable relation to the machine proper without departing from the spirit of the invention.

A cam system operates off the main drive shaft 30 to lift the blank 100 into the position where the curlers 196 and 198 can curl the flange to its final position in the curled end 200. Cam 202 is synchronous with cams 102 and 29, and like them is rigidly attached to main drive shaft 30. Arm 203 supports roller 204 on top of cam 202, and rocks as it rises and falls. Rocker shaft 206 transmits this rising and falling motion from roller 204 to arms 205 and 207. Arm 205 reciprocates plunger 208 which moves chuck 182 up and down.

As the chuck 182 is pushed up by plunger 208, blank 100 bears against the spring loaded pressure holder 184 and raises it against the pressure of spring 210 so that chuck 182 and holder 184 hold the blank 100 tightly and all turn together.

When plunger 208 has gone far enough upward so that blank 100 is on a level with curlers 196 and 198, identical rollers 212 reach the position on cams 214 and 216 which moves shafts 218 and 220 to bring curlers 196 and 198 inwardly against the flange of the can end. The speed is such that there is time to spiral curlers 196 and 198 inwardly and permit chuck 182 and associated parts to complete one full rotation after curlers 196 and 198 have reached their inmost positions. Then cams 214 and 216 move rollers 212 out and withdraw the curlers toward their outmost positions where they are when the next blank 100 is raised into position. It should be noted that, since blank 100 is rotated, curlers 196 and 198 need not be positively driven, but may consist of rollers mounted for free rotation on stub shafts 219 connected by arms 221 to shafts 218 and 220.

After being curled, the curled end 200 is retracted by plunger 208 to feed line 54. The holder 184 stops at a sufficient distance above the feed bed 54 to keep it from interfering with fingers 68, and the chuck 182 is stripped from the end 200 by moving it below the bed 54.

STAGE 6—LINING

Can end 200 is then moved by fingers 68 to the chuck 222 which rotates and otherwise operates exactly as the chuck 182. Plunger 224 is raised and lowered by arm 207 of rocker shaft 206. Spring 228 provides the pressure for holder 230, which operates exactly like spring pressure holder 184. At the uppermost position the trough of the end 200 rests directly beneath the nozzle 234. However, unlike the curling operation, the lining operation should be performed with no more than a slight overlap. One cycle is enough; any more than that wastes lining compound, overfills the trough of the can end, and dirties the machine. Moreover, it is extremely desirable to have the liner nozzle 234 open only when there is an end 200 below it, whereas it does not harm the machinery in any of the other stages if there is no blank to be worked upon. To achieve the desirable features and eliminate the undesirable ones here noted, the lining machinery involves certain novel features. (See Figs. 7 and 8.)

The bell crank latch 236 above the spring loaded pressure holder 230 is operated when rod 238 moves up against it and rod 238 is moved up by upward movement of spring loaded pressure holder 230. If there is an end 200 between the holder 230 and chuck 222, pin 238 is pushed upward against lever 236. If there is no end 200 on chuck 222, holder 230 merely enters the recess 244 in the face of chuck 222 and cannot raise rod 238 or latch 236.

Cam 252 is driven through sprocket wheel 266 and chain 268 which it bears. Chain 268 is driven by sprocket wheel 270 on main drive shaft 30, and is aligned with respect to the cam by control wheels 272 and 273. Cam 252 bears against roller 250 which is carried by arm 264.

When there is an end 200 between chuck 222 and holder 230, pin 238 pushes latch 236 upward and thus releases detent 246 from contact with the corresponding detent 247 on lever 248. Arm 264, lever 248 and lever 240 are all fixed to a common shaft 251. Spring 242 acting upon lever 240 urges lever 248 upward, but such movement is prevented as long as roller 250 rides on the high dwell of cam 252. When roller 250 drops to the low dwell 253 of cam 252, lever 248 raises the plunger 254 inside nozzle 234 to open the nozzle's needle valve 256 and permit liner compound to flow out and into the trough of the can end. Compound 258 is fed into nozzle 234 through tube 260 and opening 262. (See Fig. 9.)

When there is no end 200 between chuck 222 and holder 230, detent 246 continues to engage the corresponding detent 247 on lever 248 and restrains movement of lever 248 when roller 250 would otherwise engage the low dwell 253 of cam 252. Hence plunger 254 is not raised and the liner compound does not flow out of nozzle 234.

The whole nozzle assembly is pivoted on shaft 274 so that it may be swung about for inspection, adjustment, or repair. Cam 252 can be adjusted by bolts 276 to change the cycle since the cam actually consists of two plates, and adjustment of the cam enables the entire lining operation to be adjusted with respect to main drive shaft 30 to give one cycle of operation with whatever speed the chuck 222 is being rotated. Handle 278, which is used to swing the liner about shaft 274 also has a lock 280 to secure it during actual operation of the machine.

STAGE 7—IDLE

The space taken up by liner nozzle 234 requires that stage 7 be an idle one. From stage 7, the lined end 300 is carried by the last feed bar fingers 72 into stage 8.

STAGE 8—DRYER

Fingers 72 feed the lined end 300 into an opening 302 in dryer 304. The dryer includes two tall, concentric cylinders, cylinder 306 being inside cylinder 308 and having a diameter enough smaller so that the distance between the inner surface of cylinder 308 and outer surface of cylinder 306 is slightly greater than the diameter of end 300.

Winding up from the entrance 302 to discharge opening 310 at the top of dryer 304 are two buttress threads 312 and 314, of identical pitch, somewhat greater than the height of the finished cover 300. The thread 312 lies along the inner face of cylinder 308 and the cooperating thread 314 lies along the outer face of cylinder 306. The threads themselves are rather shallow and the distance between the troughs of the two cooperating threads 312 and 314 is enough greater than the diameter of cover 300 to allow it to be moved freely upward along the threads; for such purpose cylinder 306 may be changed to accommodate ends of different diameters.

As has been explained earlier, main drive shaft 30 drives dryer shaft 32 through bevel gears 34 and 36. At the top of shaft 32 and rigidly fastened to it is a geared wheel 316. The rim 318 is geared to mesh with wheel 316, and spokes 320 extend into hub 322, which is concentric with the dryer and just below the bottom of tracks 312 and 314 and rests on bearing 324 so that it can rotate as driven by gear 316. From each spoke 320 a rod 326 extends upwardly to a corresponding spoke 328 extending radially outwardly from annular ring 329. Ring 329 carries a plurality of rollers 336 mounted to rotate about vertical axes and spaced equally about the lower surface of ring 329, there being five such rollers in the preferred embodiment of the invention. The rollers 336 bear against the outer surface of annular track 327 which is mounted on the top of cylinder 306. Thus the rods 326 are maintained vertically disposed in the annular space between cylinders 306 and 308, but are vertically supported only at the bottom, i. e. by spokes 320.

The drive rods 326 are so mounted as to move in a circular path approximately half way between the inner and outer cylinders 306 and 308. They engage the can covers 300 and push them up the tracks 312—314. Since they are driven indirectly by main drive shaft 30, their number, spacing and speed can readily be regulated to synchronize them with the fingers 72 which deposit the ends 300 in dryer 304.

As the ends 300 wind upwardly along the tracks 312 and 314, they are subjected to a current of hot air which passes upward from circular burner 330 through duct 332 into the space between the two cylinders. A powerful fan 334 forces hot air out and sets up a rapid circulation within dryer 304.

When the ends 300 reach the discharge opening 310 at the top of the dryer, they ride up on the horizontal shelves 338 and 339, fixed to inner cylinder 306 and outer cylinder 308, respectively, and projecting into the space between the cylinders. The shelves have beveled leading edges 340 to lift the ends onto the shelves. Shelf 338 is curved as at 341 to direct the ends outwardly through opening 310 and a guide 342 is formed on shelf 339 adjacent port 310 also to direct the ends outwardly. Each end is pushed out of the dryer by the succeeding end and to prevent the ends from piling on top of each other, a horizontal, curved bar 343 is positioned about the height of a can end above the plane of shelves 338 and 339, thus restraining vertical movement of the ends. As the ends are pushed out of the dryer they are collected in bags or stacked and wrapped. They are thus ready to be used in appropriate seaming machines.

What is claimed is:

1. A can endmaker for making finished can ends from metal discs, including in combination, a rotatable timing shaft, a plurality of spaced actuating means on said shaft and rotated thereby, means to support a stack of discs, means to withdraw said discs from said stack one at a time, said last-named means being actuated by one of said actuating means, a reprocatory feed bar having fingers for periodically transferring each of said discs from one stage of operation to another, means for reciprocating said feed bar, said last-named means being actuated by one of said actuating means, means to form said disc into an end blank having a circumferential flange, said last-named means being actuated by one of said actuating means, means to curl said flange inwardly, said last-named means being at least partially actuated by one of said actuating means, means to deposit lining compound within the trough adjacent said curl, said last-named means being at least partially actuated by one of said actuating means, means to dry and cure said lining compound, said last-named means including a rotating element rotated by one of said actuating means, and idle stations between said withdrawing means and said forming means, between said forming and curling means, and between said lining and drying means, said idle stations including means driven and synchronized by said timing shaft to raise and lower said discs out of the way of said returning feed bar fingers and magnets in contact with said discs.

2. A can endmaker comprising in combination, a horizontally reciprocatory feed bar having fingers adapted to engage and advance from stage to stage can ends, a feed stage for serially feeding can end blanks from a stack of blanks into engagements with said feed bar, a press stage including a vertically reciprocatory die, a curler stage including a first reciprocatory chuck, a liner stage including a second reciprocatory chuck, said die and said chucks being arranged to move said can ends out of the path of travel of said fingers, cam means actuating said feed bar and said stages arranged to actuate said feed stage to deposit an end on said feed bar in advance of said fingers and to actuate said die and said chucks to move said can end out of engagement with said fingers during retraction of said fingers, and an idler stage interposed between two of said stages and including a reciprocatory element having a magnet arranged to be actuated by said cam means to move said can end out of the path of travel of said fingers during retraction of said fingers and attracting and holding a can end until said fingers wipe said end from said magnet.

3. A can endmaker for making finished can ends from metal discs, including in combination, a rotatable timing shaft, a plurality of spaced actuating means on said shaft and rotated thereby, means to support a stack of discs, means to withdraw said discs from said stack one at a time, said last-named means being actuated by one of said actuating means, a reciprocatory feed bar having fingers for periodically transferring each of said discs from one stage of operation to another, means for reciprocating said feed bar, said last-named means being actuated by one of said actuating means, means to form said disc into an end blank having a circumferential flange, said last-named means being actuated by one of said actuating means, means to curl said flange inwardly, said last-named means being at least partially actuated by one of said actuating means, means to deposit lining compound within the trough adjacent said curl, said last-named means being at least partially actuated by one of said actuating means, means to dry and cure said lining compound, said last-named means including a rotating element rotated by one of said actuating means, and idle stations between said withdrawing means and said forming means, between said forming and curling means, and between said lining and drying means, said idle stations including means driven and synchronized by said timing shaft to raise and lower said discs out of the way of said returning feed bar fingers.

WILLIAM BERNARD PETERSON, Jr.
ROLAND ERNEST RENARD.

REFERENCES CITED

The following references are of record in the file of this patent:

UNITED STATES PATENTS

| Number | Name | Date |
|---|---|---|
| 1,152,395 | Butler | Sept. 7, 1915 |
| 1,344,405 | Jensen | June 22, 1920 |
| 1,625,091 | Peters | Apr. 19, 1927 |
| 1,639,118 | Troyer | Aug. 16, 1927 |
| 1,798,407 | Erb | Mar. 31, 1931 |
| 1,891,646 | Krueger | Dec. 20, 1932 |
| 2,061,589 | Philps | Nov. 24, 1936 |